No. 777,682.

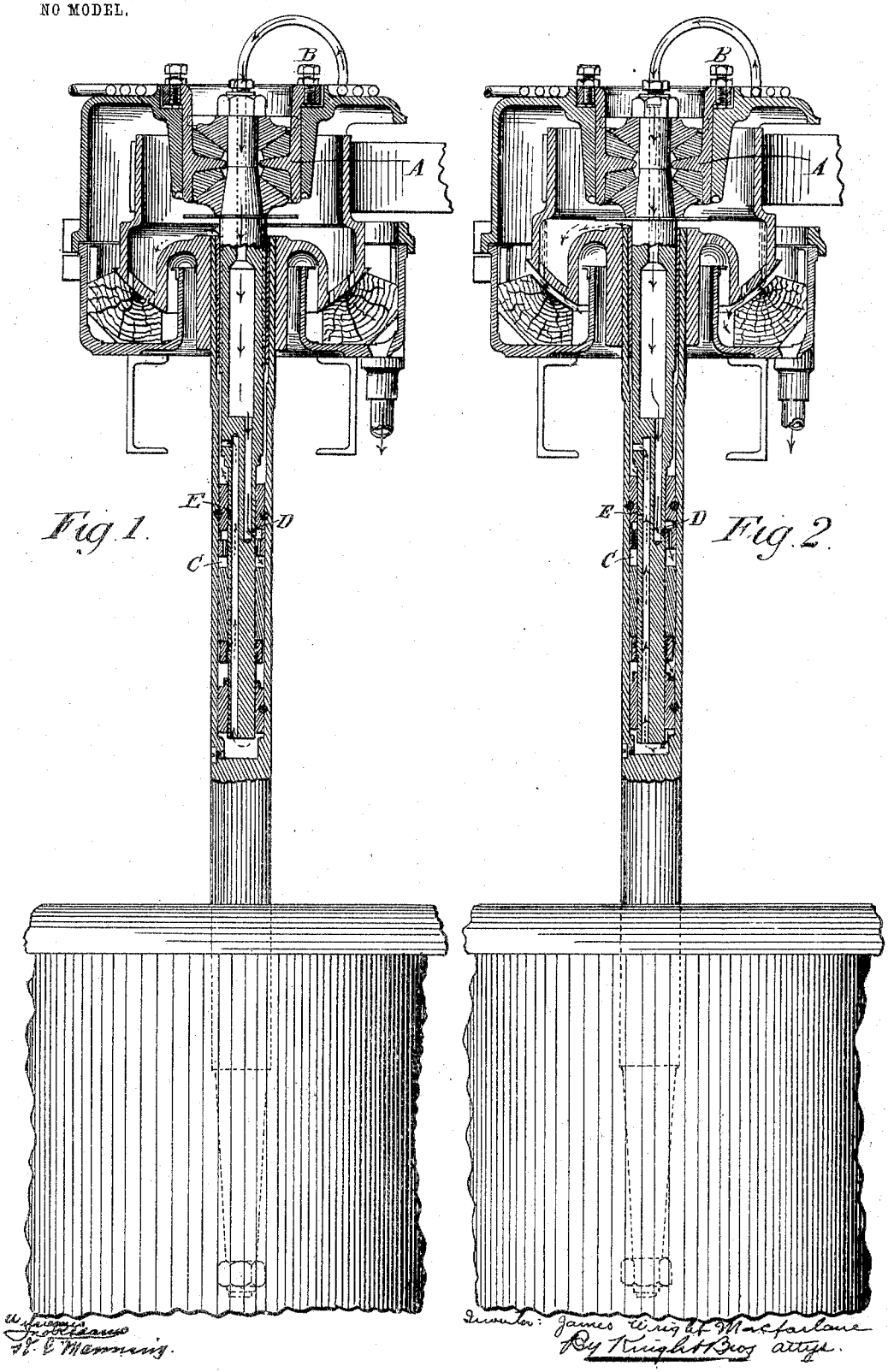

Patented December 20, 1904.

UNITED STATES PATENT OFFICE.

JAMES WRIGHT MACFARLANE, OF GLASGOW, SCOTLAND.

FLUID-PRESSURE BEARING.

SPECIFICATION forming part of Letters Patent No. 777,682, dated December 20, 1904.

Application filed December 12, 1902. Serial No. 134,961.

*To all whom it may concern:*

Be it known that I, JAMES WRIGHT MACFARLANE, engineer, of the firm of Watson, Laidlaw & Co., of 98 Dundas street south, Glasgow, Scotland, have invented certain new and useful Improvements in Fluid-Pressure Bearings for the Vertical Shafts of Centrifugal and other Machines, of which the following is a specification.

My invention relates to improvements in centrifugal machines or hydro-extractors in which oil or other suitable fluid under pressure is substituted for the ordinary footstep-bearing, and has special reference to the oil-pressure bearings for centrifugals described in Andreas Freitag's application, Serial No. 88,866, and filed January 8, 1902.

In the construction of the spindle in the application referred to if the fluid-pressure exceeds the pressure of the machine it is intended to support the spindle may rise too far in its bearings, and this circumstance demands some regulation of the pressure of the oil which is forced into the spindle to maintain the weight of the machine, so that the rise of the spindle may be limited. A reference to Freitag's application will show that means are provided to allow the escape of the fluid and relieve the pressure when the spindle has been raised to a given position.

My improvement consists in providing a port or ports on the inlet or pressure side instead of escape side, which ports are opened and closed by the spindle as it falls or rises in the same manner as is done in Freitag's application. The advantage of the ports being on the inlet side instead of on the escape side is that only the quantity of oil which is required to maintain the spindle at the proper position will be admitted. If the ports are on the escape side and the load in the revolving basket of the centrifugal is such as to require the escape-port kept open, an increased amount of oil would have to be pumped to maintain the pressure in the volume of oil passing through the spindle.

As in Freitag's application, I provide a port or ports to allow of the escape of any accumulation of pressure which might be caused by leakage past the bushes or bearings of the spindle.

My invention is applicable to the bearings described in Freitag's application. It is also applicable to any fluid-pressure bearing where a vertical spindle is revolved in parallel bearings, external or internal.

In order that my invention may be properly understood and readily carried into effect, I have hereunto appended two sheets of drawings, of which—

Figures 1 and 2, being vertical sections, show how the invention is carried out in the case of centrifugals which have hollow spindles.

Referring to Figs. 1 and 2, the section marked Fig. 1 shows the relative positions of the outer and inner spindle when the oil-pressure is shut off, and in this relation the top pulley rests on the brake. When the oil-valve is opened and the oil admitted into the pressure-chamber C, as shown by arrows drawn in full lines in Fig. 2, the outer spindle is raised. As the outer spindle rises it acts as a valve and closes the inlet-port D, as shown in section Fig. 2, and the position at which it comes to rest is such that the leakage from pressure-port D, due to clearances between the revolving parts, is just sufficient to maintain the pressure in chamber C, which will support the load. The effect of this arrangement is to reduce the supply of oil required to a minimum. Should the leakage become great enough to increase the pressure in the chamber C beyond what is required to support the spindle and basket, the outer spindle will rise still farther; but this increase of upward movement is limited by the port E to prevent the possibility of too great an upward movement. As soon as the upward movement of the spindle has uncovered the port E direct communication is established between the oil-pressure chamber and the oil-return port, thus allowing the excess pressure to escape. The outer spindle will thereupon drop sufficiently to again cover the port E.

I claim—

In a fluid-sustained spindle device for centrifugal machines, the combination of an outer revolving spindle, an inner stationary spindle, annular piston-like parts between the spindles, said stationary spindle having passages for admitting the fluid between the pistons, and said inner and outer spindles being provided with ports controlling the flow of liquid to the pistons, substantially as described.

In testimony whereof I have affixed my signature in presence of two witnesses.

JAMES WRIGHT MACFARLANE.

Witnesses:
JOHN LIDDLE,
AGNES MACKINTOSH.